Dec. 19, 1961    C. G. CLARK    3,013,678
WORK HANDLING MECHANISM
Filed July 20, 1960    4 Sheets-Sheet 3

INVENTOR.
Chester G. Clark.
BY
Harness, Dickey & Pierce
ATTORNEYS.

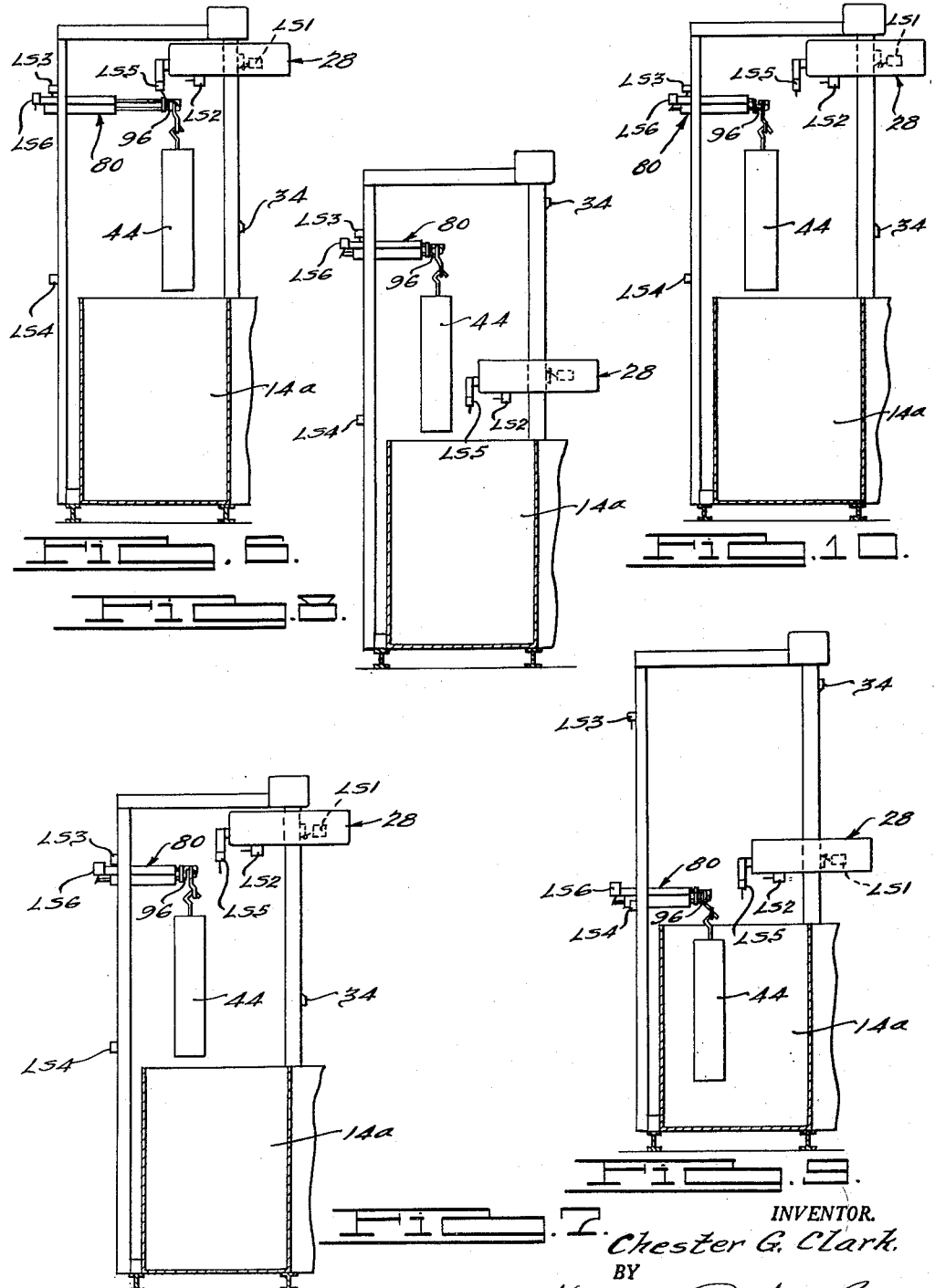

United States Patent Office 3,013,678
Patented Dec. 19, 1961

3,013,678
WORK HANDLING MECHANISM
Chester G. Clark, Detroit, Mich., assignor to The Udylite Corporation, Detroit, Mich., a corporation of Delaware
Filed July 20, 1960, Ser. No. 44,032
17 Claims. (Cl. 214—89)

The present invention pertains to conveying apparatus for transferring workpieces through a series of treating stations and more particularly, to an auxiliary work handling mechanism which can readily be installed on a principal conveying machine providing for selective skip and delay dip operations.

The novel work handling mechanism comprising the present invention is broadly applicable to conveying machines of the general type disclosed in United States Patent Re. 24,072, issued October 11, 1955, originally United States Patent No. 2,650,600, issued September 1, 1953. In conveying machines of the general type disclosed in the aforementioned patent, a plurality of workpieces are movably suspended from a supporting rail and conveyed therealong by means of a reciprocable pusher-type transfer mechanism. As the workpieces are advanced along the supporting rail, they are periodically raised and lowered in order that they can be transferred over the partitions separating adjoining treating receptacles. The sequential lifting and lowering of the workpieces is usually achieved by a suitable elevator chassis to which sections of the supporting rail are secured whereby the workpieces suspended thereon are lifted and lowered as the elevator chassis is raised and lowered. The elevating movement of the elevator chassis and the advancing movement of the transfer mechanism are automatically coordinated, whereby the workpieces are successively and sequentially transferred through a predetermined treating sequence.

It frequently becomes desirable to concurrently process two or more types of workpieces which deviate slightly in their respective prescribed treating sequences. Alternatively, it frequently becomes necessary to process a small number of workpieces in a relatively short duration processing run through a treating sequence which deviates slightly from the predetermined treating sequence of the principal conveying machine. It has heretofore been necessary in order to accommodate selected workpieces deviating slightly in their prescribed treating sequences to either modify the treating receptacle arrangement or alternately to modify the control sequence of the principal conveying machine. Both of these methods are inefficient and time consuming. To overcome these costly and time consuming practices, relatively complex and cumbersome structures have recently been incorporated in conventional conveying apparatuses in order to provide a limited degree of processing flexibility. These structures, however, are not only expensive to install and to maintain, but are difficult to modify and control.

It is accordingly a principal object of the present invention to provide a unique work handling apparatus that can be simply and quickly installed at one or a plurality of selected treating stations of a principal conveying machine and which apparatus can be simply integrated with the operating sequence of the principal conveying machine.

Another object of this invention is to provide an auxiliary work handling apparatus that can be incorporated in new machines as well as in the field on existing equipment and which apparatus provides processing versatility and flexibility heretofore unobtainable on machines of similar type.

Still another object of this invention is to provide a work handling apparatus providing for selective automatic operation in coordination with the principal conveying machine and which selective operation is controlled in response to presetable means on each of the work carriers providing for automatic delayed dip, skip, or early pickup operation of selected workpieces at selected treating stations.

A further object of this invention is to provide a work handling apparatus that is of simple design, durable operation, and economical manufacture.

The foregoing and other objects of this invention are achieved by a work handling mechanism having a structure characterized by a stationary framework disposed at a treating station laterally of the principal conveying machine and having a rail section movably mounted thereon and movable laterally as well as up and down over the treating station whereby successive work carriers advanced along the supporting rail of the principal machine are selectively passed through the predetermined treating sequence of the principal conveying machine or alternatively, through a skip or delayed dip operating sequence.

Other objects and advantages of the present invention will become apparent from the following detailed description taken in conjunction with the accompanying drawings wherein:

FIG. 4 is a perspective view of a work carrier and the presetable levers thereon;

FIG. 5 is a transverse vertical section view through the slide mechanism on the carriage shown in FIG. 3 and taken along line 5—5 thereof; and FIGS. 6 to 10 are diagrammatic fragmentary transverse sectional views of the work handling mechanism illustrating the operating sequence thereof.

Figure 1:
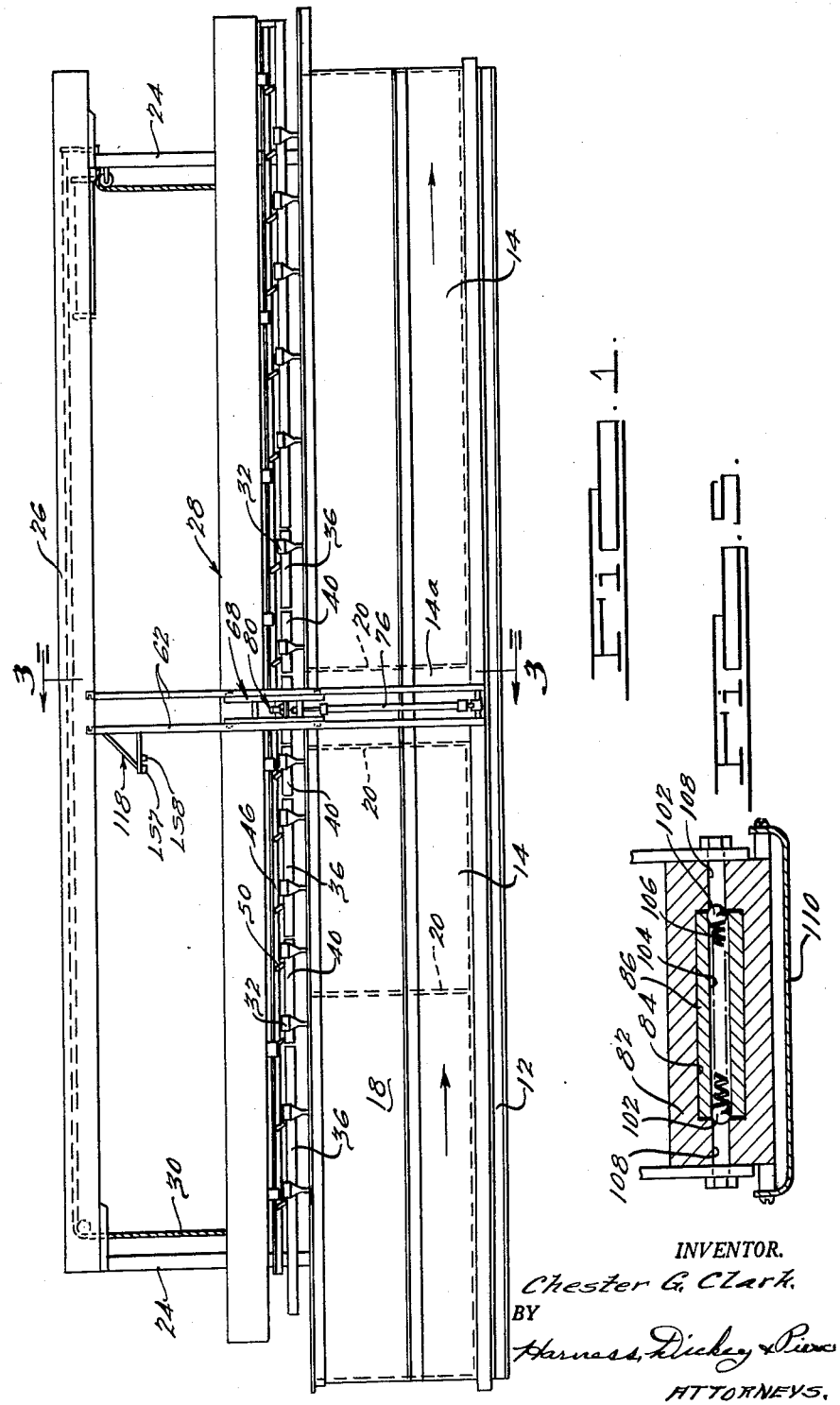
FIGURE 1 is a front elevation view of a conveying machine incorporating therein a work handling mechanism constructed in accordance with the preferred embodiments of this invention, and showing the elevator chassis of the conveying machine and the carriage of the work handling mechanism in the lowered positions.
Figure 2:
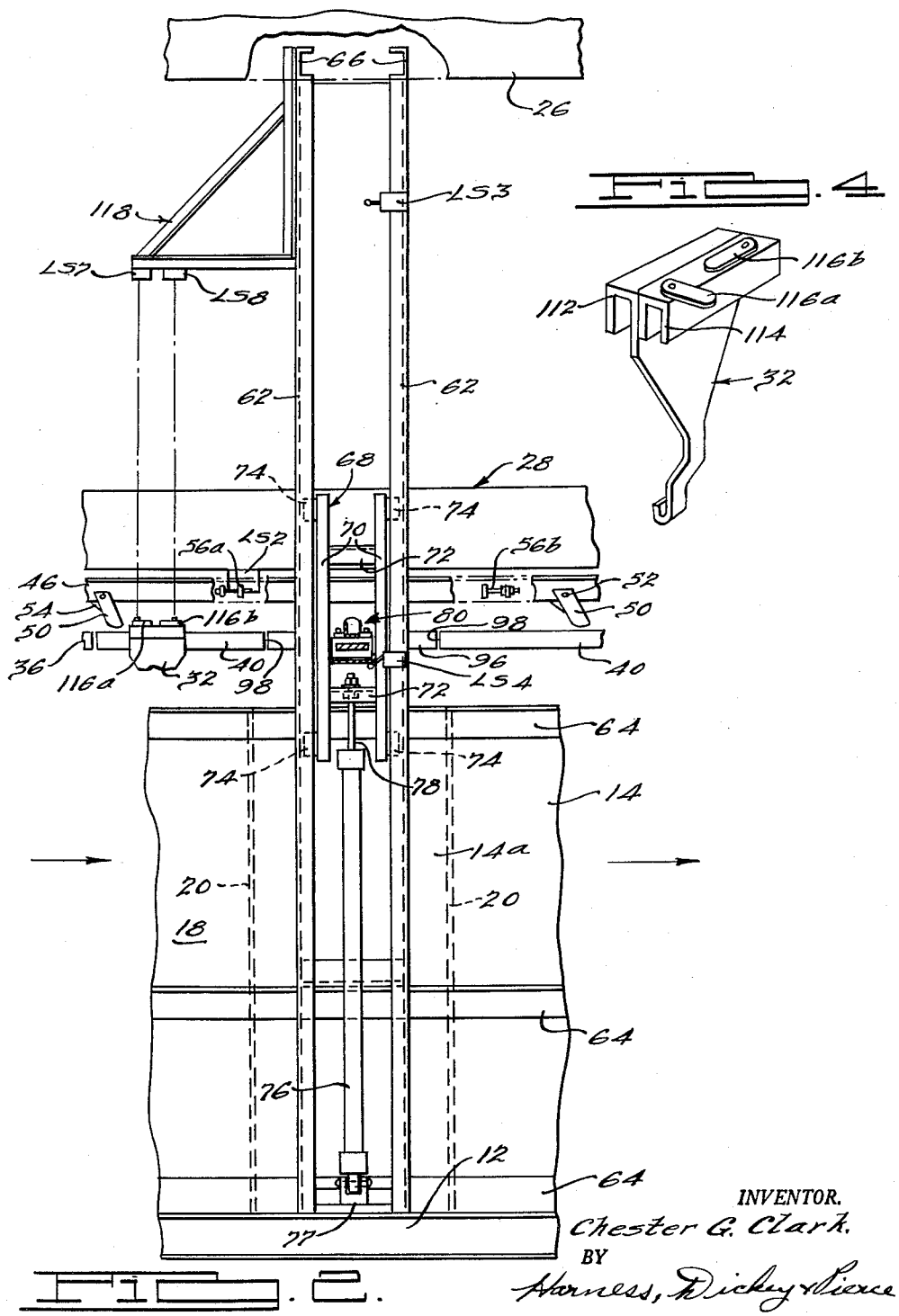
FIG. 2 is an enlarged fragmentary front elevation view of the work handling mechanism shown in FIGURE 1.
Figure 3:
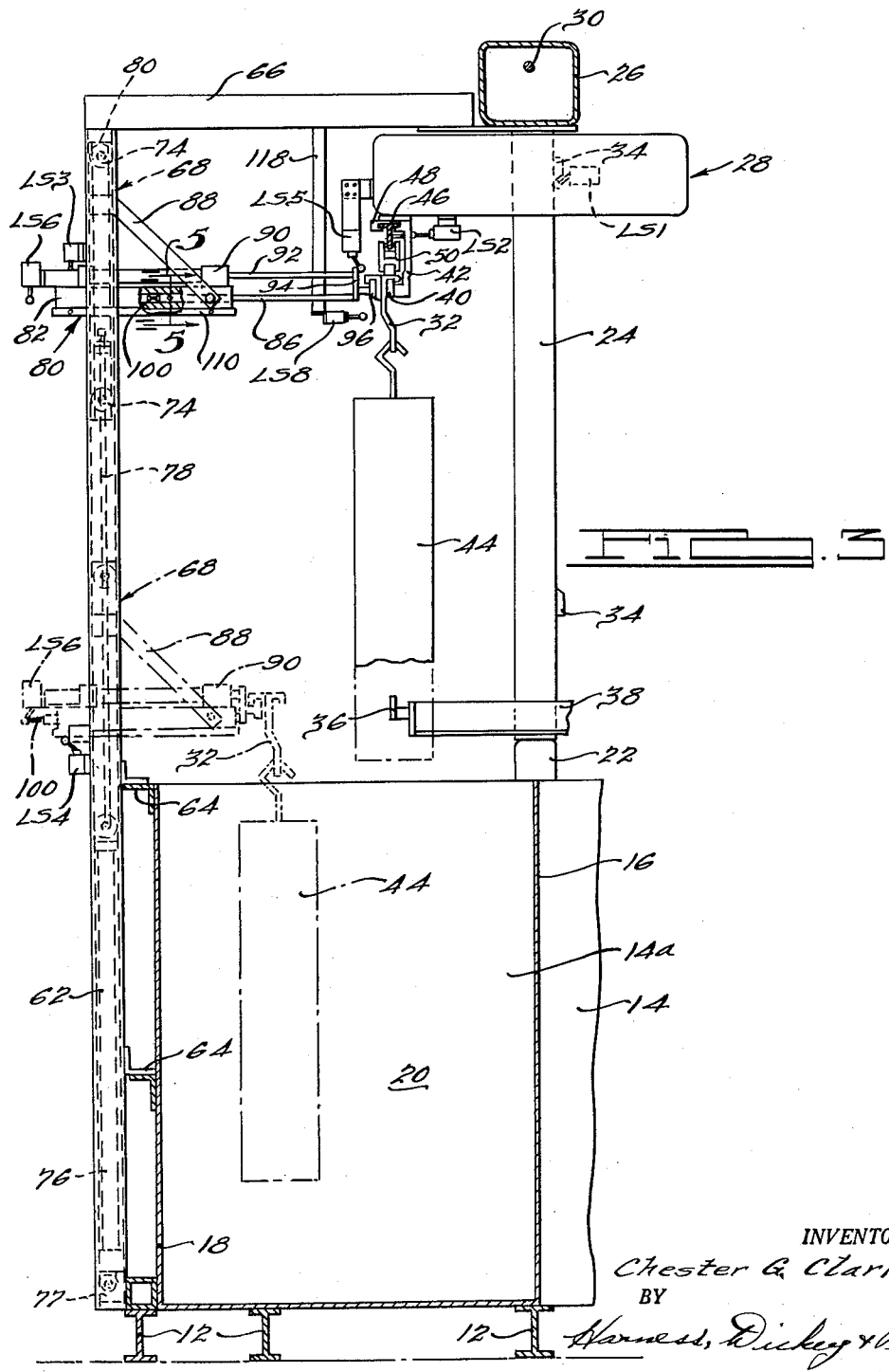
FIG. 3 is a fragmentary transverse section view of the conveying machine and work handling mechanism shown in FIGURE 1 and taken along line 3—3 thereof and illustrating the elevator chassis of the conveying machine in the raised position and the carriage and rail section of the work handling mechanism in the raised position in solid lines and in the lowered position in phantom.

Referring now in detail to the drawings and as may be best seen in FIGURES 1-3, a typical conveying machine to which the present invention is applicable comprises a central frame including a series of base beams 12 forming a rigid platform on which an aligned series of treating receptacles 14 are mounted. The treating receptacles 14 include a central partition 16 extending along substantially the longitudinal center of the machine and side partitions 18 extending along substantially the longitudinal center of the machine and side partitions 18 extending along the sides of the machine defining therewith spaced rows of receptacles. A series of transverse partitions 20 extend between the central partition 16 and the side partitions 18 defining an aligned series of treating receptacles or treating stations through which the workpieces are successively and sequentially conveyed.

A longitudinal box beam 22 is rigidly affixed to the upper end of the central partition 16 on which the lower end portions of end columns 24 are rigidly affixed. A longitudinal box frame 26 extends between and is rigidly affixed to the upper ends of the end columns 24 forming therewith a superstructure from which an elevator chassis 28 is suspended and guided during its up and down travel.

The elevator chassis 28 is moved to and from a raised position and a lowered position by means of a suitable actuating mechanism such as, for example, a cable 30 that is connected to the chassis and extends upwardly therefrom over suitable pulleys through the box frame 26 and is connected to the crosshead of a double acting chassis lift cylinder mounted in the box frame 26. Reciprocation of the lift cylinder causes the elevator chassis to move to and from a lowered position as shown in FIGURE 1 to a raised position as shown in FIG. 3 wherein a plurality of work carriers 32 suspended therefrom are raised and lowered. Actuation of the lift cylinder is controlled by a chassis control limit switch LS1 mounted on the elevator chassis 28 and which switch is adapted to be tripped by cams 34 affixed to the upper and lower portions of one of the end columns 24 when the chassis attains the fully elevated or fully lowered positions.

An aligned series of spaced fixed rail sections 36 are positioned directly over the treating receptacles 14 and are rigidly secured to cross members 38 affixed to the longitudinal box beam 22. An aligned series of spaced vertically movable rail sections 40 are secured to the underside of the elevator chassis 28 by brackets 42 and are raised and lowered as the chassis is raised and lowered. When the elevator chassis 28 is in the lowered position, the movable rail sections 40 fit in the spaces between the fixed rail sections 36 and are aligned therewith forming a supporting rail extending around the machine comprising a pair of straight side sections connected at their ends by arcuate turnaround rail sections. A plurality of the work carriers 32 having workpieces or work racks 44 suspended therefrom are movably mounted on the fixed and movable rail sections and are intermittently advanced therealong in the direction of the arrows. At treating stations where an electrochemical or electroplating operation is to be performed, the workpieces can be electrified by any of the means well known in the art such as, for example, by supplying current to insulated sections of the supporting rail adjacent to the treating stations. The movable rail sections 40 are provided adjacent to the transverse partitions 20 in order that the work carriers 32 and the workpieces 44 suspended therefrom are raised and can be transferred over the partitions to the next adjoining treating receptacles.

The intermittent movement of the work carriers 32 along the straight side portions of the conveying machine is achieved by a reciprocable pusher-type transfer mechanism comprising a pusher bar 46 of a T-shaped cross section slidably mounted in shoes 48 comprising an integral part of the brackets 42 affixed to the underside of the elevator chassis 28. The pusher bar 46 is provided with a plurality of longitudinally spaced pushers 50 which are pivotally mounted on pins 52 and are adapted to engage the upper projecting portion of the work carriers 32. Each of the pushers 50 incorporates a suitable stop 54 thereon which is adapted to engage the lower web portion of the pusher bar 46 during the advancing movement of the pusher bar holding the pusher from pivoting at this time. During the retracting movement of the pusher bar 46, the pushers 50 pivot upwardly into an inoperative position whenever they are retracted across the top of a work carrier 32. Advancement of the work carriers 32 around the arcuate end sections of the supporting rail is achieved by a rotatably mounted pusher arm (not shown) which is actuable in response to the reciprocating movement of the pusher bar 46 as shown and described in detail in the aforementioned patent to which reference is made for specific details of the principal conveying machine.

The reciprocating movement of the pusher bar 46 is controlled by a suitable limit switch LS2 mounted on the chassis adjacent to the pusher bar and which is adapted to be tripped by actuators 56a, 56b adjustably mounted on the pusher bar when it attains its fully advanced and fully retracted positions, respectively. A suitable arrangement of the limit switch LS2 and actuators 56a, 56b is shown in FIGS. 2 and 3 wherein the pusher bar is illustrated in the fully advanced position and in which position actuator 56a is operative to trip the limit switch LS2. Actuation of the limit switch LS2 is effective to control a suitable fluid actuated double-acting transfer cylinder connected to the pusher bar 46. It will be apparent from the drawings, that when the elevator chassis is in the raised position only the work carries on the vertically movable rail sections 40 are advanced on the advancing movement of the pusher bar. On the other hand, when the elevator chassis is in the lowered position all of the work carriers on the fixed rail sections and vertically movable rail sections are advanced.

It will of course be appreciated by those skilled in the art that suitable alternate satisfactory work advancing mechanisms such as, for example, an intermittently driven drive chain can be incorporated on the principal conveying apparatus in lieu of the reciprocable pusher bar mechanism hereinabove described. It will also be appreciated that the present invention is equally applicable to conveying machines of the straight-through type wherein the work-pieces are loaded at one end of the machine and are unloaded at the other remote end thereof in lieu of the turn-around type conveying apparatus shown in the drawings wherein the workpieces travel in a circuitous path from the loading station to the unloading station.

In conveying machines of the type herein described, the workpieces are successively and sequentially transferred through the treating receptacles in a predetermined treating sequence. To achieve increased processing flexibility and machine versatility, one or more of the work handling mechanisms comprising the present invention can be installed at selected stations along the path of travel of the workpieces. For the purposes of the present description, only one such work handling mechanism has been incorporated in the machine shown in the drawings and is positioned, as shown in FIG. 1, laterally of the single station treating receptacle 14a. In that position, work handling mechanism may alternately be employed to provide a skip operation wherein the work carrier 32 and workpieces 44 suspended therefrom are maintained in an elevated position above the receptacle completely skipping immersion in the treating solution contained in the treating receptacle 14a and thereafter transferred along to the next treating station, or can be employed as a delayed dip mechanism wherein the workpieces 44 are lowered into treating receptacle 14a at a point of time delayed from the lowering of the elevator chassis. It is also contemplated that the work handling mechanism can be positioned at the first station of a multiple station treating receptacle wherein it can be employed to provide a delayed dip operation whereby the workpieces 44 suspended thereon are immersed in the treating solution at the first station of the multiple station tank a predetermined delay time period after the elevator chassis has been lowered. Additionally, the work handling apparatus can be disposed at the last station of a multiple station tank whereby it can provide for an early pickup operation wherein a work carrier transferred to the station is raised a predetermined time period before the elevator chassis is raised. In order to accommodate the work handling mechanism, it may be necessary or desirable in some installations to extend the width of the treating receptacle at that station to provide sufficient clearance for the work racks when they are lowered.

The work handling mechanism, as may be best seen in FIGS. 2 and 3, is comprised of a pair of upright track members or channel guides 62 of a U-shaped cross section and are disposed in opposing substantially parallel spaced relationship. The channel guides 62 are rigidly affixed along the lower portions thereof to angle iron stringer members 64 affixed to the side partition 18 adjacent the single station treating receptacle 14a. At their upper ends, the channel guides 62 are rigidly affixed to the box frame 26 of the principal conveying machine by transverse channel braces 66. A carriage 68 is movably mounted between the channel guides 62 and includes a pair of spaced vertical members 70 rigidly affixed to each other by a series of cross members 72. Guide rollers 74 are rotatably mounted on the ends of the vertical members 70 and are disposed in rotatable bearing contact with the inner surfaces of the flanges of the channel guides 62. Movement of the carriage 68 to and from a raised position and a lowered position is achieved in the specific embodiment shown by a suitable fluid actuated reversible carriage lift cylinder 76 having the closed end thereof pivotally connected to a cross member 77 affixed to the lower end portion of the channel guides 62 and the rod end portion thereof extending upwardly between the channel guides 62 in a manner as may be best seen in FIG. 2. A piston rod 78 of the cylinder 76 is detachably secured to one of the cross members 72 of the carriage 68 whereby actuation of the cylinder is effective to cause the carriage to move to and from a raised position and a lowered position corresponding to the raised and lowered positions of the elevator chassis 28. The lifting and lowering movement of the cylinder 76 is controlled by an up-position limit switch LS3 and a down-position limit switch LS4 which aret adjustably mounted on one of the channel guides 62 and are adapted to be tripped by suitable projections extending from the carriage 68 when the carriage attains the fully raised and fully lowered positions, respectively. Actuation of the limit switches LS3 and LS4 causes suitable solenoid controlled valves to open and close whereby the flow of the actuating fluid into the closed and rod ends of the carriage lift cylinder 76 is controlled halting the slide carriage in the appropriate position.

Mechanical stops may alternately be employed to limit the raised and lowered positions of the carriage whereby the limit switches LS3 and LS4 would serve to initiate motion of the cylinder 76 and would be interlocked in the control circuit to assure proper sequential functioning.

A reversible slide mechanism 80 is mounted on the carriage 68 and is movable thereby to and from a raised position and a lowered position as the carriage is raised and lowered. The reversible slide mechanism 80 comprises a slide guide body 82 having a rectangular aperture 84 extending longitudinally therethrough and adapted to slidably receive a correspondingly shaped rectangular slide 86. The slide guide body 82 is affixed to the slide carriage 68 and to one of the cross members 72 of the carriage 68 and is maintained in a substantially horizontal position by diagonal braces 88. A double acting fluid actuated slide cylinder 90 is mounted on the upper surface of the slide guide body 82 having the longitudinal axis of a piston rod 92 thereof disposed substantially parallel to the path of travel of the slide 86 and disposed substantially perpendicular to the movable rail sections 40 connected to the elevator chassis 28. The forward end portions of the slide 86 and the piston rod 92 are connected by a crosshead member 94 to which is connected a laterally movable rail section 96 having a length corresponding substantially to a gap 98 in the movable rail sections 40 disposed adjacent thereto as may be best seen in FIG. 2. The forward or loading end of the laterally movable rail section 96 and loading end of the movable rail section 40 adjacent thereto may be provided with a suitable taper to facilitate alignment and engagement of the rail sections with a work carrier 32 as it is advanced on and off the laterally movable rail section.

The supply of pressurized fluid for actuating the carriage lift cylinder 76 and the slide cylinder 90 can be derived from the central fluid system of the principal conveying machine or alternatively, from an auxiliary fluid system of a type well known in the art. The slide cylinder 90 is provided with suitable flexible conduits (not shown) enabling unrestricted movement of the carriage 68.

The laterally movable rail section 96 when in the fully projected position as shown in solid lines in FIG. 3 is disposed contiguous to the gap 98 and substantially parallel to but laterally spaced outwardly from the longitudinal axis of the movable rail sections 40. In the retracted position as shown in phantom in FIG. 3, the laterally movable rail section 96 is disposed laterally of the principal conveying machine and out of the vertical path of travel of the elevator chassis 28. The lateral reciprocating stroke of the reversible slide mechanism 80 is controlled by a projected position limit switch LS5 affixed to the chassis and adapted to be actuated by the crosshead member 94 when the laterally movable rail section 96 attains the appropriate projected position. Actuation of limit switch LS 5 is effective to close a solenoid valve stopping the flow of fluid to the closed end of the slide cylinder 90 thereby stopping the projecting travel of the laterally movable rail section in the appropriate position. The retracted position of the laterally movable rail section 96 is controlled by a retracted position control limit switch LS6 mounted on the slide guide body 82 and actuable by a suitable actuator screw 100 adjustably secured in the end portion of the slide 86. When limit switch LS6 is tripped by the actuator screw 100, a solenoid valve connected to a fluid conduit supplying fluid to the open end of the slide cylinder 90 is closed, whereby the retracting movement of the laterally movable rail section 96 is halted in the appropriate retracted position. To avoid drifting of the laterally movable rail section 96 from the fully projected or fully retracted positions, a suitable lock mechanism may be employed, as may be best seen in FIG. 5 which is adapted to resiliently maintain the slide 86 in a fixed position relative to the slide guide body 82 until the slide cylinder 90 is again actuated. As shown in FIG. 5 the resilient lock comprises a pair of ball bearings 102 disposed in a circular aperture 104 extending transversely and horizontally through the slide 86 and are resiliently urged outwardly by a coil spring 106 disposed therebetween. The slide guide body 82 is provided with a pair of transversely aligned circular apertures 108 at each end thereof which are alignable with the ball bearings 102 when the slide 86 attains the projected and retracted positions. The coaction between the ball bearings 102 seated in the circular apertures 108 in the slide guide body 82 prevents inadvertent relative movement between the slide and slide guide body until the slide cylinder 90 is actuated wherein the ball bearings 102 are forced inwardly in opposition to the resilient biasing force of the coil spring 106 providing unrestricted travel of the slide to and from the retracted and projected positions. As will be noted in the drawings, the reversible slide mechanism 80 can also be provided with a suitable drip pan 110 connected to and extending below the slide guide body 82 to catch any fluid which may accidentally seep through the seal at the open end of the slide cylinder 90.

As heretofore mentioned in regard to the operation of the carriage cylinder 76, suitable position stops may be alternately incorporated in the slide mechanism whereby the limit switches LS5 and LS6 are operative only to initiate the action of the slide cylinder 90 and are interlocked in the control circuit to assure appropriate sequential functioning of the components.

The work carrier 32 as shown in FIG. 4 is provided with a suitable U-shaped engaging portion 112 at the upper end thereof for engaging the fixed and movable rail sections extending around the principal conveying machine. A similar U-shaped engaging portion 114 is affixed to the upper end portion of the work carrier 32 which is adapted to engage the laterally movable rail section 96 as the work carrier is advanced from the adjacent movable rail section to the treating station above single station treating receptacle 14a. Selective skip or delayed-dip operation of the workpieces suspended on the work carrier 32 can be automatically achieved by presetable means such as levers 116a, 116b pivotally secured to the upper portion of the work carrier 32 as shown in FIG. 4 and movable to and from an inoperative retracted position to an operative projected position. Movement of either of the levers 116a, 116b to the operative position causes the tripping of either skip selector limit switch LS7 or delay-dip selector limit switch LS8 during the elevating movement of the work carrier positioned on the movable rail section 40 adjacent to the treating receptacle 14a. The limit switches LS7 and LS8 are adjustably affixed to a framework 118 suspended from one of the transverse channel braces 66 and are positioned in substantial vertical alignment with actuating levers 116a, 116b, respectively, on a work carrier positioned at a station adjacent to the treating receptacle 14a as may best be seen in FIGURE 2. By this arrangement, an operator at the loading station of the principal conveying machine can position lever 116a or 116b to the appropriate position whereby the workpieces suspended on that work carrier will automatically undergo a skip or a delayed dip operation at the treating receptacle 14a.

In installations wherein the work handling mechanism is to be employed as a delay-dip mechanism at the first station of a multiple station tank only one actuating lever 116a, 116b need be employed on the work carrier which would be effective to alternately and automatically provide a delay-dip or normal operation. Similarly, if the work handling mechanism is to be employed solely for providing a selective skip operation at a single station treating receptacle only one lever 116a, 116b need be incorporated on the work carrier which would enable automatic selectivity at the station between a skip or normal operating sequence. More simply, in runs of substantial duration wherein each of the workpieces is to be subjected to the same skip or delayed dip operating sequence, the work handling mechanism can be provided with a master control switch whereby each of the work carriers would be subjected to the same treating sequence at a particular station. When a work carrier is transferred on the laterally movable rail section which is to undergo a normal treating sequence at that station, the carriage lift cylinder 76 is operative to lower and raise the work carrier and workpieces thereon at the same time that the chassis is lowered and raised. This can be achieved with the laterally movable rail section either in the retracted or projected position. At such times that the operation of the work handling mechanism is not desired, the master control circuit of the work handling mechanism can be deenergized with the laterally movable rail section in the retracted position and a suitable rail section inserted in the gap 98 between the adjacent movable rail sections 40 whereby the workpieces would be subjected to the predetermined treating sequence of the principal conveying machine. It will be understood that the work carriers 32 can be provided with additional presetable means such as levers 116a, 116b to effect automatic selective operation of two or more work handling mechanisms positioned at various stations along the path of travel of the workpieces on the principal conveying machine.

In operation, and with particular reference to FIGS. 6–10 the treating sequence through which a particular work carrier and the workpieces suspended therefrom are to undergo in accordance with the machine shown in the drawings, is established at the time the workpieces are loaded on the principal conveying machine and at which time the operator presets the levers 116a, 116b on the work carrier 32 in the appropriate position. The work carrier and workpieces suspended therefrom are thereafter intermittently advanced along the fixed rail sections 36 and movable rail sections 40 in accordance with the predetermined treating sequence of the principal conveying machine until they approach the treating station next to the single station treating tank 14a which is provided with the work handling mechanism comprising the present invention. The work carrier 32 is then advanced from the preceding treating station to the position shown in FIG. 2 on the movable rail section 40 by the advancing movement of the pusher bar 46. When the pusher bar 46 attains the fully advanced position the actuator 56a thereon trips the pusher bar limit switch LS2 signaling the control circuit of the principal conveying machine and the control circuit of the work handling mechanism that the work carriers have attained the fully advanced position and that the elevator chassis 28 and the carriage 68 can be raised to the elevated position. Accordingly, the lift cylinder of the principal conveying machine is actuated causing the elevator chassis 28 to commence its elevating movement and concurrently, the carriage lift cylinder 76 is actuated causing the carriage 68 to commence its elevating movement. When the tripping lever 116b on the work carrier 32 supported on the movable rail section 40 is in the operative position, delay-dip selector limit switch LS8 is actuated as the elevator chassis moves upwardly toward the raised position. The tripping of limit switch LS8 signals the control circuit of the work handling mechanism that the work carrier and workpieces suspended therefrom are to undergo a delay-dip operating sequence in the single station treating receptacle 14a.

The elevator chassis 28 continues its elevating movement until limit switch LS1 is actuated by the upper cam 34 signaling the control circuit of the principal conveying machine, which deactuates the chassis lift cylinder halting the chassis in the raised position. Similarly, when the carriage 68 attains the fully elevated position, carriage up-position limit switch LS3 is tripped which signals the control circuit of the work handling mechanism which deactuates the carriage lift cylinder 76. In the specific machine shown the up-position limit switch LS1 of the elevator chassis and up-position limit switch LS3 of the carriage are interlocked so that both limit switches must be actuated before the laterally movable rail section 96 commences its movement from the retracted to the projected position. It is also contemplated that the rail section 96 can be moved to the projected position during the elevating movement of the elevator chassis and the slide carriage. When both limit switches LS1 and LS3 have been actuated signifying that both the elevator chassis and slide carriage have attained their fully raised positions, the control circuit of the work handling mechanism is signaled whereby the slide cylinder 90 is actuated causing the laterally movable rail section 96 to move from the fully retracted position to the fully projected position. When the laterally movable rail section 96 attains the fully projected position, projected position limit switch LS5 is tripped by the crosshead member 94 signaling the control circuit of the work handling mechanism which deactuates the slide cylinder 90. This position is shown diagrammatically in FIG. 6 wherein the elevator chassis 28 and carriage 68 are in the raised position and the laterally movable rail section is in the fully projected position.

The tripping of projected position limit switch LS5 also signals the control circuit of the principal conveying machine that the laterally movable rail section is now in position to receive the work carrier positioned on the adjacent movable rail section 40. Accordingly, the pusher bar transfer cylinder is actuated causing the work carrier to be advanced off the movable rail section and during which movement the engaging portion 114 (FIG. 4) on the carrier becomes disposed in overlying engagement on the laterally movable rail section 96. When the pusher bar attains the fully advanced position, the actuator 56a thereon (FIG. 2) trips limit switch LS2 which deactuates the transfer cylinder stopping the pusher bar in the fully advanced position. Limit switch LS2 is also connected to the control circuit of the work handling mechanism signaling the work mechanism that the work carrier is now appropriately positioned on the laterally movable rail section and the slide cylinder 90 is actuated causing the laterally movable rail section 96 to be moved from the projected position diagrammatically shown in FIG. 6 to the retracted position as shown diagrammatically in FIG. 7. When the laterally movable rail section attains the fully retracted position, retracted position limit switch LS6 is tripped which deactuates the slide cylinder 90 and simultaneously signals the control circuit of the principal conveying machine that the laterally movable rail section is out of the path of travel of the elevator chassis whereby the chassis lift cylinder is actuated causing the chassis to commence its downward movement. Retracted position limit switch LS6 when actuated is also effective to energize a suitable delay-dip dwell timer in the control circuit of the work handling mechanism which commences to time a presetable delay time period.

During the initial downward movement of the elevator chassis 28, limit switch LS1 is released by the upper cam 34 which signals the control circuit of the principal conveying machine and actuates the transfer cylinder causing the pusher bar to commence its retracting movement, the pusher bar continues its retracting movement until actuator 56b trips limit switch LS2 (FIG. 2) which deactuates the transfer cylinder stopping the pusher bar in the fully retracted position and interlocking sequential movement. The chassis continues its downward movement until limit switch LS1 is tripped by the lower cam 34 which deactuates the chassis lift cylinder stopping the chassis in the fully lowered position as shown diagrammatically in FIG. 8. The tripping of limit switch LS1 is also effective to energize a down dwell timer in the control circuit of the principal conveying machine which commences to time a predetermined down dwell period.

While the down dwell timer of the principal conveying machine is timing a predetermined down dwell period during which the workpieces on the fixed rail sections 36 and movable rail sections 40 are immersed in the treating receptacle, the delay-dip timer continues to time a predetermined delay period. At the expiration of the delay period, the delay-dip timer signals the control circuit of the work handling mechanism which actuates the carriage lift cylinder 76 causing the carriage to move from the elevated position shown diagrammatically in FIG. 8 to the lowered position as shown in FIG. 9 during which movement the workpieces 44 suspended from the laterally movable rail are immersed in the treating solution in the single station treating tank 14a. The delay-dip timer continues to time a predetermined down dwell period which is calculated to expire at a point in time coinciding with the completion of the next advancing movement of the pusher bar as will hereinafter be described.

With the elevator chassis 28 and the slide carriage in the fully lowered position as shown diagrammatically in FIG. 9, the down dwell timer of the principal conveying machine continues to time a predetermined down dwell period at the expiration of which the control circuit of the principal conveying machine is signaled causing the transfer cylinder to be actuated whereby the pusher bar 46 commences its advancing movement and during which movement another work carrier 32 is transferred from the fixed rail section 36 adjacent to the single station treating receptacle 14a onto the movable rail section 40 disposed below the skip and delay-dip selector limit switches LS7 and LS8, respectively, as shown in FIG. 2. At the completion of the advancing stroke of the pusher bar 46, actuator 56a trips limit switch LS2 signaling the control circuit of the principal conveying machine and the control circuit of the work handling mechanism that the work carriers are in appropriate position. The delay-dip timer in the work handling mechanism is calculated to expire at a point of time corresponding to the tripping of limit switch LS2 by the actuator 56a on the pusher bar. The concurrence of these events constitutes a preferred practice whereby the principal machine and work handling mechanism simultaneously complete their respective treating steps.

By virtue of the adjustability of the delay-dip timer, down dwell periods of the workpieces on the laterally movable rail section can be obtained which range from a short duration dip to an immersion period approaching that provided by the principal conveying machine. The total timing period of the delay-dip timer is set to correspond to the time interval during which the elevator chassis moves from the raised position to the lowered position, the chassis's down dwell period, and the time required for the pusher mechanism to move from the retracted to the advanced position. The total timing period of the delay-dip timer comprises the delay-dip period during which the laterally movable rail is maintained in the raised position and the down dwell period during which the laterally movable rail is lowered from the raised position and is maintained in the lowered position until the expiration of the total timing period. Accordingly, the net down dwell period of the work handling apparatus is obtained by subtracting from the total timing period of the delay-dip timer, the sum of the delay-dip period and the time required to lower the carriage. By varying the delay-dip period, variations can be obtained in the down dwell period to provide the appropriate treatment.

Before the elevator chassis 28 can be moved to the raised position, three events must occur; namely, the tripping of limit switch LS2, the tripping of down position limit switch LS4, and the expiration of the down delay-dip timer which are interlocked to assure that both the principal conveying machine and work handling mechanism have completed their down dwell cycles. On the happening of these events, the control circuit of the principal conveying machine is signaled, whereby the chassis lift cylinder is actuated causing the elevator chassis to commence its elevating movement and concurrently the carriage lift cylinder 76 is actuated causing the carriage and laterally movable rail section connected thereto to commence their elevating movement. During the initial elevating movement of the elevator chassis 28, chassis control limit switch LS1 is released by the lower cam 34 signaling the transfer cylinder to retract the pusher bar from the fully advanced to the fully retracted position. As the elevator chassis moves through the upper portion of its travel, the next work carrier adjacent to the single station treating receptacle 14a trips either skip limit switch LS7 or delay-dip limit switch LS8 depending on whether actuator lever 116a or 116b has been positioned in the operative position. A suitable memory circuit of the type well known in the art is incorporated in the control circuit of the work handling mechanism which receives the impulse or signal from skip or delay-dip selector limit switches LS7 and LS8 and retains the signal until the work carrier positioned on the laterally movable rail section has completed its selected operating sequence.

Accordingly, the elevator chassis 28 and carriage 68 are moved from their lowered positions as shown diagrammatically in FIG. 9 to their raised positions as shown diagrammatically in FIG. 10. When the elevator chassis attains the fully raised position, chassis control limit switch LS1 is again actuated by upper cam 34 which deactuates the chassis lift cylinder stopping the chassis in the raised position. Similarly, when the carriage 68 attains the fully raised position, up-position limit switch LS3 is tripped deactuating the carriage lift cylinder 76 stopping the carriage in the raised position. On the actuation of both limit switches LS1 and LS3, the control circuit of the work handling mechanism is signaled whereby slide cylinder 90 is actuated causing the laterally movable rail section 96 to move from the retracted position shown diagrammatically in FIG. 10 to the projected position shown diagrammatically in FIG. 6. When the laterally movable rail attains the projected position, projected position limit switch LS5 is tripped deactuating the slide cylinder 90 and signaling the control circuit of the principal conveying machine that the laterally movable rail section is in position to discharge the work carrier thereon and to receive the next work carrier positioned on the adjacent movable rail section. Accordingly, the transfer cylinder is actuated causing the pusher bar to commence its forward travel whereby the work carrier and workpieces suspended therefrom are transferred off the laterally movable rail section and the next work carrier is advanced onto the laterally movable rail section to undergo a treating sequence in accordance with that selected by levers 116a, 116b.

The operation of the work handling mechanism when a skip operating sequence has been selected is similar to that heretofore described for the delay-dip operation except that the carriage 68 is retained in the fully elevated position for the entire cycle whereby the workpieces 44 suspended from the laterally movable rail section are not lowered into the treating receptacle 14a. In accordance with the skip cycle, the tripping of limit switch LS2 when the pusher bar attains the fully advanced position causes the laterally movable rail section to move from the fully projected position shown diagrammatically in FIG. 6 to the retracted position shown diagrammatically in FIG. 7 and in which position limit switch LS6 is tripped signaling the elevator chassis to commence its downward movement. The elevator chassis moves to the lowered position as shown in FIG. 8; the chassis undergoes a predetermined down dwell period; the pusher bar is moved from the retracted to the advanced position while the chassis is in the down position; and thereafter the elevator chassis is again raised to the fully elevated position as shown diagrammatically in FIG. 10. When chassis control limit switch LS1 is tripped by upper cam 34, the control circuit of the work handling mechanism is signaled whereby the laterally movable rail section is moved from the retracted position shown diagrammatically in FIG. 10 to the projected position shown in FIG. 6, and limit switch LS5 is tripped which signals the pusher mechanism to commence its advancing movement. Accordingly, the work carrier which has undergone a skip operation is transferred off the laterally movable rail section onto the next adjacent movable rail section and a succeeding work carrier is transferred from the preceding station onto the laterally movable rail section as hereinbefore described.

The foregoing operating sequence relates to an automatic selective skip and delay-dip operation of successive work carriers at the single station treating receptacle 14a. It will of course, be appreciated by those skilled in the art that when two or more work handling mechanisms are incorporated along the path of travel of the workpieces on the principal conveying machine, the control systems of each of the work handling mechanisms and the control circuit of the principal conveying machine are suitably integrated and interlocked to assure that all of the work handling mechanisms and principal conveying machine have completed their specific operating function before the next step of the treating cycle is started. In processing sequences wherein each of the work carriers is to be subjected to the same skip or delay-dip operating sequence at one or more treating stations, the selector switches LS7 and LS8 and the tripping levers 116a and 116b on the work carriers can be eliminated whereby each particular work handling mechanism will undergo a specified skip or delay-dip operation as predetermined by the control circuit of the work handling mechanism, and whereby each successive work carrier will be subjected to the same treating sequence.

When the work handling mechanism comprising the present invention is positioned at the first station of a multiple station tank, the operating sequence thereof deviates from that heretofore described in connection with the selective skip and delayed-dip operation at the single station treating receptacle 14a. In a delay-dip operation at the first station of a multiple station treating receptacle, the laterally movable rail section 96 while in the raised and projected position receives a work carrier 32 from the adjacent elevated movable rail section 40 during the advancing movement of the pusher mechanism. The laterally movable rail section is thereafter moved to the retracted position wherein the delay-dip timer is actuated and commences to time a predetermined delay period during which time the elevator chassis 28 is lowered. On the expiration of the delay time period, the carriage lift cylinder 76 is actuated lowering the carriage 68 whereby the work carrier and workpieces thereon are lowered into the first station of the multiple station treating receptacle. When the carriage 68 attains the fully lowered position and trips carriage down-position limit switch LS4 the slide cylinder 90 is actuated moving the laterally movable rail section 96 from the retracted position to the projected position contiguous to the adjacent fixed rail section 36. At the completion of the down dwell period of the principal conveying machine the pusher mechanism is actuated whereby the work carrier on the laterally movable rail section is transferred off the laterally movable rail section and onto the adjacent fixed rail section. At the completion of the advancing movement of the pusher mechanism, as established by the tripping of limit switch LS2 by the actuator 56a, the carriage 68 can be raised concurrently with the elevator chassis 28 with the laterally movable rail section 96 in the projected position or alternatively, the laterally movable rail section is first retracted and thereafter raised to avoid any conflict between the work handling mechanism and the elevator chassis during their ascending motion. In the latter instance, the laterally movable rail section is moved from the retracted to the projected position after the carriage 68 attains the elevated position and in which projected position the next adjacent work carrier on the movable rail section 40 can be transferred to the laterally movable rail section.

When the work handling mechanism is positioned at the last station of a multiple station treating receptacle so as to provide an early pickup operation, the operating sequence commences with the laterally movable rail section 96 in the lowered projected position contiguous to a gap and disposed adjacent to the end of the fixed rail 36 over the multiple station treating receptacle. In such an arrangement, the advancing movement of the pusher mechanism is accomplished immediately after the elevator chassis attains the fully lowered position whereby the work carrier on the fixed rail section is transferred to the laterally movable rail section. At the completion of the advancing movement of the pusher mechanism, limit switch LS2 is tripped by actuator 56a which concurrently energizes the down dwell timer of the principal conveying machine, the down dwell timer of the work handling mechanism, and actuates the slide cylinder 90 causing the laterally movable rail section 96 to be moved from the projected to the retracted position. At the completion of the down dwell period of the work handling mechanism, the carriage lift cylinder 76 is actuated whereby the carriage 68 is moved to the raised position and during which movement the workpieces suspended on the work carrier are raised out of the last station of the multiple station treating receptacle a predetermined time period before the elevator chassis is raised. At the completion of the down dwell period of the principal conveying machine, the elevator chassis 28 is raised and upon attaining the fully raised position, as indicated by the tripping of limit switch LS1, the laterally movable rail section 96 is moved from the retracted to the projected position adjacent to a movable rail section 40 on the elevator chassis. On the tripping of the projected position limit switch LS5, the pusher mechanism is actuated whereby the work carrier is advanced off the laterally movable rail section 96 and onto the adjacent movable rail section 40. At the completion of the advancing movement of the pusher mechanism, as signified by the tripping of limit switch LS2 by the actuator 56a, the elevator chassis 28 and the carriage 68 can be lowered concurrently or alternatively, the laterally movable rail section 96 is first retracted and then lowered to avoid any possible conflict between the elevator chassis and the work handling mechanism during the descending movement thereof. In the latter instance, when the carriage 68 attains the lowered position and trips down-position limit switch LS4, the slide cylinder 90 is actuated whereby the laterally movable rail section is moved from the retracted to the projected position contiguous to the gap and adjacent to the fixed rail section 36 in the lowered position. When the elevator chassis attains the fully lowered position as signified by the tripping of limit switch LS1 by the lower cam 34 and the laterally movable rail section has attained the lowered and projected positions as indicated by limit switches LS4 and LS5, respectively, the pusher transfer mechanism is actuated whereby the next successive work carrier is advanced from the fixed rail section 36 to the laterally movable rail section 96.

It is also contemplated that in lieu of actuating the pusher transfer mechanism immediately after the elevator chassis and laterally movable rail section attain the lowered position to enable an early pickup operation, the pusher transfer mechanism may be operated in the conventional sequence as heretofore described wherein the pusher mechanism is actuated at the completion of the down dwell period of the principal conveying machine. When the pusher mechanism is operated in accordance with the conventional sequence, a suitable auxiliary transfer mechanism is required operative to advance a work carrier from the fixed rail section 36 to the laterally movable rail section 96 immediately after the elevator chassis and laterally movable rail section have attained the lowered position. The completion of the advancing movement of the auxiliary pusher mechanism as signaled by a suitable limit switch would cause the slide cylinder 90 to be actuated whereby the laterally movable rail section is moved from the projected to the retracted position in accordance with the cycle heretofore described.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. In a conveying machine, the combination comprising a first frame, alignable discontinuous rail means having a gap therein mounted on said first frame, sections of said discontinuous rail means movable to and from a raised position and a lowered position, a second frame disposed laterally of said discontinuous rail means, rail means on said second frame movable to and from a raised position and a lowered position and to and from a projected position and a retracted position, means for moving said rail means to and from said positions independently of the movable sections of said discontinuous rail means, work supporting means movably mounted on said discontinuous rail means, advancing means for advancing said work supporting means along said discontinuous rail means and said rail means, said rail means when in said projected position disposed contiguous to the gap in said discontinuous rail means and in lateral spaced longitudinal alignment with said discontinuous rail means whereby said work supporting means can be advanced on and off said rail means from and to the adjacent said discontinuous rail means, said rail means when in said retracted position disposed laterally from said projected position and out of the path of travel of said movable sections of said discontinuous rail means.

2. In a conveying machine, the combination comprising a first frame, alignable discontinuous rail means having a gap therein mounted on said first frame, sections of said discontinuous rail means movable to and from a raised position and a lowered position, a second frame disposed laterally of said discontinuous rail means, a rail on said second frame movable to and from a raised position and a lowered position and to and from a projected position and a retracted position, means for moving said rail to and from said positions independently of the movable sections of said discontinuous rail means, work supporting means movably mounted on said discontinuous rail means, advancing means on said first frame for intermittently advancing said work supporting means along said discontinuous rail means and said rail when in said projected position, said rail when in said projected position disposed contiguous to the gap in said discontinuous rail means and in laterally spaced longitudinal alignment with said discontinuous rail means whereby said work supporting means can be advanced on and off said rail from and to the adjacent said discontinuous rail means, said rail when in said retracted position disposed laterally from said projected position and out of the path of travel of said movable sections of said discontinuous rail means.

3. In a conveying machine, the combination comprising a first frame, alignable discontinuous rail means having a gap therein mounted on said first frame, sections of said discontinuous rail means movable to and from a raised position and a lowered position, a second frame disposed laterally of said discontinuous rail means, carriage means on said second frame movable to and from a raised position and a lowered position, a rail on said carriage means movable to and from a projected position and a retracted position, means for moving said carriage means up and down and for moving said rail to and from said projected position and said retracted position independently of the movable sections of said discontinuous rail means, work supporting means movably mounted on said discontinuous rail means, pusher means on said first frame for intermittently advancing said work supporting means along said discontinuous rail means and said rail when in said projected position, said rail when in said projected position disposed contiguous to the gap in said discontinuous rail means and in lateral spaced longitudinal alignment with said discontinuous rail means whereby said work supporting means can be advanced on and off said rail from and to the adjacent said discontinuous rail means, said rail when in said retracted position disposed laterally from said projected position and out of the path of travel of said movable sections of said discontinuous rail means.

4. In a conveying machine for conveying a plurality of work supporting means through a series of treating stations, the combination comprising a frame, alignable discontinuous rail means having a gap therein mounted on said frame over the treating stations, sections of said discontinuous rail means movable to and from a raised position and a lowered position, an upright framework disposed at one treating station laterally of said discontinuous rail means and the gap therein, a rail on said framework movable over the one treating station to and from a raised position and a lowered position and to and from a projected position and a retracted position, means for moving said rail to and from said positions independently of the movable sections of said discontinuous rail means, a plurality of work supporting means movably mounted on said discontinuous rail means and said rail, advancing means on said frame for intermittently advancing said work supporting means along said discontinuous rail means and said rail when in said projected position, said rail when in said projected position disposed contiguous to the gap in said discontinuous rail means and in lateral spaced longitudinal alignment with said discontinuous rail means whereby said work supporting means can be advanced on and off said rail from and to the adjacent said discontinuous rail means, said rail when in said retracted position disposed laterally from said projected position and out of the path of travel of the said movable sections of the said discontinuous rail means.

5. In a conveying machine for conveying a plurality of work supporting means through a series of treating stations, the combination comprising a frame, alignable discontinuous rail means having a gap therein mounted on said frame over the treating stations, sections of said discontinuous rail means movable to and from a raised position and a lowered position, an upright framework disposed at one treating station laterally of said discontinuous rail means and the gap therein including track means thereon, carriage means movably mounted on said track means and movable to and from a raised position and a lowered position, power means for moving said carriage to and from said positions, a rail on said carriage means movable over the one treating station to and from a projected position and a retracted position, reversible actuating means for moving said rail to and from said projected and retracted positions, a plurality of work supporting means movably mounted on said discontinuous rail means and said rail, pusher means on said frame for intermittently advancing said work supporting means along said discontinuous rail means and said rail when in said projected position, said rail when in said projected position disposed contiguous to the gap in said discontinuous rail means and in lateral spaced longitudinal alignment with said discontinuous rail means whereby said work supporting means can be advanced on and off said rail from and to the adjacent said discontinuous rail means, said rail when in said retracted position disposed laterally from said projected position and out of the path of travel of said discontinuous rail means.

6. In a conveying machine for conveying a plurality of work supporting means through a series of treating stations, the combination comprising a frame, alignable discontinuous rail means having a gap therein mounted on said frame over the treating stations, sections of said discontinuous rail means movable to and from a raised position and a lowered position, upright guide means disposed in spaced substantially parallel relation at one treating station laterally of said discontinuous rail means and the gap therein, a carriage movably mounted on said guide means and movable to and from a raised position and a lowered position, power means connected to said carriage for moving said carriage up and down, reversible actuating means on said carriage, a rail on said reversible actuating means and movable thereby over the one treating station to and from a projected position and a retracted position, a plurality of work carriers movably mounted on said discontinuous rail means and said rail, pusher means on said frame for intermittently advancing said work carriers along said discontinuous rail means and said rail when in said projected position, said rail when in said projected position disposed contiguous to the gap in said discontinuous rail means and in lateral spaced longitudinal alignment with said discontinuous rail means whereby said work carriers can be advanced on and off said rail from and to the adjacent said continuous rail means, said rail when in said retracted position disposed laterally from said projected position and out of the path of travel of the movable sections of said discontinuous rail means, and control means for coordinating the up and down movement of said carriage and lateral movement of said rail with the movement of said movable sections of said discontinuous rail means.

7. In a conveying machine for successively conveying a plurality of workpieces through a series of treating stations including an elevator chassis movable to and from a raised position and a lowered position, an alignable series of rail sections disposed over the treating stations having a gap therein and including movable sections carried by the chassis, a plurality of work carriers movably mounted on the rail sections, and pusher means on the chassis for advancing the work carriers along the rail sections, the improvement comprising a work handling mechanism disposed at one of the treating stations for receiving successive work carriers on the rail sections and moving the carriers over the one treating station in a prescribed sequence and thereafter returning the carriers to the rail sections, said mechanism comprising a framework disposed laterally of the rail sections and the gap therein, a rail on said framework movable to and from a raised position and a lowered position and to and from a projected position and a retracted position, means for moving said rail to and from said positions independently of the elevator chassis, said rail when in said projected position disposed contiguous to the gap in the rail sections and in lateral spaced longitudinal alignment therewith whereby work carriers can be advanced on and off said rail from and to the adjacent rail sections, said rail when in said retracted position disposed over the one treating station laterally of said projected position and out of the path of travel of the elevator chassis.

8. In a conveying machine for successively conveying a plurality of workpieces through a series of treating stations including an elevator chassis movable to and from a raised position and a lowered position, an alignable series of rail sections disposed over the treating stations having a gap therein and including movable sections carried by the chassis, a plurality of work carriers movably mounted on the rail sections, and pusher means on the chassis for advancing the work carriers along the rail sections, the improvement comprising a work handling mechanism disposed at one of the treating stations for receiving successive work carriers on the rail sections and moving the carriers over the one treating station in a prescribed sequence and thereafter returning the carriers to the rail sections, said mechanism comprising a framework disposed laterally of the rail sections and the gap therein, carriage means on said framework movable to and from a raised position and a lowered position, a rail on said carriage means movable to and from a projected position and a retracted position, means for moving said carriage means up and down and said rail to and from said projected position and said retracted position independently of the elevator chassis, said rail when in said projected position disposed contiguous to the gap in the rail sections and in lateral spaced longitudinal alignment therewith whereby work carriers can be advanced on and off said rail from and to the adjacent rail sections, said rail when in said retracted position disposed over the one treating station laterally of said projected position and out of the path of travel of the elevator chassis.

9. In a conveying machine for successively conveying a plurality of workpieces through a series of treating stations including an elevator chassis movable to and from a raised position and a lowered position, an alignable series of rail sections disposed over the treating stations having a gap therein and including movable sections carried by the chassis, a plurality of work carriers movably mounted on the rail sections, and pusher means on the chassis for advancing the work carriers along the rail sections, the improvement comprising a work handling mechanism disposed at one of the treating stations for receiving successive work carriers on the rail sections and moving the carriers over the one treating station in a prescribed sequence and thereafter returning the carriers to the rail sections, said mechanism comprising an upright framework disposed laterally of the rail sections and the gap therein including track means thereon, carriage means movably mounted on said track means and movable to and from a raised position and a lowered position, power means for moving said carriage means to and from said positions independently of the elevator chassis, a rail on said carriage means movable over the one treating station to and from a projected position and a retracted position, reversible actuating means for moving said rail to and from said projected position and said retracted position, said rail when in said projected position disposed contiguous to the gap in the rail sections and in lateral spaced longitudinal alignment therewith whereby work carriers can be advanced on and off said rail from and to the adjacent rail sections, said rail when in said retracted position disposed over the one treating station laterally of said projected position and out of the path of travel of the elevator chassis.

10. In a conveying machine for successively conveying a plurality of workpieces through a series of treating stations including an elevator chassis movable to and from a raised position and a lowered position, an alignable series of rail sections disposed over the treating stations having a gap therein and including movable sections carried by the chassis, a plurality of work carriers movably mounted on the rail sections, and pusher means on the chassis for advancing the work carriers along the rail sections, the improvement comprising a work handling mechanism disposed at one of the treating stations for receiving successive work carriers on the rail sections and moving the carriers over the one treating station in a prescribed sequence and thereafter returning the carriers to the rail sections, upright guide means disposed in spaced substantially parallel relationship laterally of the rail sections and the gap therein, a carriage movably mounted on said guide means and movable to and from a raised position and a lowered position, power means for raising and lowering said carriage independently of the elevator chassis, reversible actuating means on said carriage, a rail on said reversible actuating means and movable thereby over the the one treating station to and from a projected position and a retracted position, said rail when in said projected position disposed contiguous to the gap in the rail sections and in lateral spaced longitudinal alignment therewith whereby work carriers can be advanced on and off said rail from and to the adjacent rail sections, said rail when in said retracted position disposed over the one treating station laterally of said projected position and out of the path of travel of the elevator chassis.

11. In a conveying machine for successively conveying a plurality of workpieces through a series of treating stations including an elevator chassis movable to and from a raised position and a lowered position, an alignable series of rail sections disposed over the treating stations having a gap therein and including movable sections carried by the chassis, a plurality of work carriers movably mounted on the rail sections, and pusher means on the chassis for advancing the work carriers along the rail sections, the improvement comprising a work handling mechanism disposed at one of the treating stations for receiving successive work carriers from the adjacent movable rail section in the raised position and thereafter lowering the work carriers a predetermined time period after the elevator chassis is lowered and returning the work carriers to the next adjacent rail station in the lowered position providing a delayed-dip operation, said mechanism comprising a framework disposed laterally of the rail sections and the gap therein, a rail on said framework movable to and from a raised position and a lowered position and to and from a projected position and a retracted position, means for moving said rail to and from said positions independently of the elevator chassis, said rail when in said projected position disposed contiguous to the gap in the rail sections and in lateral spaced longitudinal alignment therewith whereby work carriers can be advanced on and off said rail from and to the adjacent rail sections, said rail when in said retracted position disposed over the one treating station laterally of said projected position and out of the path of travel of the elevator chassis, and control means for coordinating the operation of said mechanism with the conveying machine.

12. In a conveying machine for successively conveying a plurality of workpieces through a series of treating stations including an elevator chassis movable to and from a raised position and a lowered position, an alignable series of rail sections disposed over the treating stations having a gap therein and including movable sections carried by the chassis, a plurality of work carriers movably mounted on the rail sections, and pusher means on the chassis for advancing the work carriers along the rail sections, the improvement comprising a work handling mechanism disposed at one of the treating stations for receiving successive work carriers from the adjacent movable rail section in the raised position and maintaining the work carriers in the raised position while the chassis is lowered and thereafter returning the work carriers to the next adjacent movable rail section in the raised position providing a skip operation, said mechanism comprising a framework disposed laterally of the rail sections and the gap therein, a rail on said framework movable to and from a raised position and a lowered position and to and from a projected position and a retracted position, means for moving said rail to and from said positions independently of the elevator chassis, said rail when in said projected position disposed contiguous to the gap in the rail sections and in lateral spaced longitudinal alignment therewith whereby work carriers can be advanced on and off said rail from and to the adjacent rail sections, said rail when in said retracted position disposed over the one treating station laterally of said projected position and out of the path of travel of the elevator chassis, and control means for coordinating the operation of said mechanism with the conveying machine.

13. In a conveying machine for successively conveying a plurality of workpieces through a series of treating stations including an elevator chassis movable to and from a raised position and a lowered position, an alignable series of rail sections disposed over the treating stations having a gap therein and including movable sections carried by the chassis, a plurality of work carriers movably mounted on the rail sections, and pusher means on the chassis for advancing the work carriers along the rail sections, the improvement comprising a work handling mechanism disposed at one of the treating stations for receiving successive work carriers from the adjacent rail section in the lowered position and raising the work carriers a predetermined time period before the elevator chassis is raised and thereafter returning the work carriers to the next adjacent movable rail section in the raised position providing an early pickup operation, said mechanism comprising a framework disposed laterally of the rail sections and the gap therein, a rail on said framework movable to and from a raised position and a lowered position and to and from a projected position and a retracted position, means for moving said rail to and from said positions independently of the elevator chassis, said rail when in said projected position disposed contiguous to the gap in the rail sections and in lateral spaced longitudinal alignment therewith whereby work carriers can be advanced on and off said rail from and to the adjacent rail sections, said rail when in said retracted position disposed over the one treating station laterally of said projected position and out of the path of travel of the elevator chassis, and control means for coordinating the operation of said mechanism with the conveying machine.

14. In a conveying machine for successively conveying a plurality of workpieces through a series of treating stations including an elevator chassis movable to and from a raised position and a lowered position, an alignable series of rail sections disposed over the treating stations having a gap therein and including movable sections carried by the chassis, a plurality of work carriers movably mounted on the rail sections, and pusher means on the chassis for advancing the work carriers along the rail sections, the improvement comprising a work handling mechanism disposed at one of the treating stations for receiving successive work carriers from the adjacent movable rail section in the raised position and selectively lowering and raising the work carriers over the one treating station and thereafter returning the work carriers to the next adjacent movable rail section in the raised position providing a selective skip and delayed-dip operation, said mechanism comprising a framework disposed laterally of the rail sections and the gap therein, a rail on said framework movable to and from a raised position and a lowered position and to and from a projected position and a retracted position, means for moving said rail to and from said positions of the elevator chassis, said rail when in said projected position disposed contiguous to the gap in the rail sections and in lateral spaced longitudinal alignment therewith whereby work carriers can be advanced on and off said rail from and to the adjacent rail sections, said rail when in said retracted position disposed over the one treating station laterally of said projected position and out of the path of travel of the elevator chassis, said mechanism selectively operable in response to means on said framework actuable by presetable means on the work carriers during the movement of the elevator chassis, and control means for coordinating the operating sequence of the conveying machine and said mechanism.

15. The work handling mechanism described in claim 11 further characterized by said mechanism being selectively operable to provide said delayed-dip operation on selected work carriers in response to means on said framework actuable by presetable means on the work carriers during the movement of the elevator chassis.

16. The work handling mechanism described in claim 12 further characterized by said mechanism being selectively operable to provide said skip operation on selected work carriers in response to means on said framework actuable by presetable means on the work carriers during the movement of the elevator chassis.

17. The work handling mechanism described in claim 13 further characterized by said mechanism being selectively operable to provide said early pickup operation on selected work carriers in response to means on said framework actuable by presetable means on the work carriers during the movement of the elevator chassis.

No references cited.